United States Patent
Wodrich et al.

(10) Patent No.: US 8,915,556 B2
(45) Date of Patent: Dec. 23, 2014

(54) TRACK CHAIN JOINT FOR A CRAWLER TYPE WORK VEHICLE

(75) Inventors: Timothy D. Wodrich, Reiles Acres, ND (US); Patrick J. Mulligan, Dubuque, IA (US); James G. Merten, Peosta, IA (US)

(73) Assignee: Deere & Company, Moline, IL (US)

( * ) Notice: Subject to any disclaimer, the term of this patent is extended or adjusted under 35 U.S.C. 154(b) by 274 days.

(21) Appl. No.: 13/274,755

(22) Filed: Oct. 17, 2011

(65) Prior Publication Data

US 2013/0092459 A1 Apr. 18, 2013

(51) Int. Cl.
- *B62D 55/21* (2006.01)
- *B62D 55/088* (2006.01)
- *B62D 55/32* (2006.01)

(52) U.S. Cl.
CPC .............. *B62D 55/21* (2013.01); *B62D 55/32* (2013.01); *B62D 55/0887* (2013.01)
USPC ........................... 305/201; 305/198; 305/101

(58) Field of Classification Search
CPC .. B62D 55/088; B62D 55/0887; B62D 55/21; B62D 55/15
USPC .......... 305/101, 102, 103, 104, 198, 201, 42; 105/224.1; 267/279; 403/225, 228
See application file for complete search history.

(56) References Cited

U.S. PATENT DOCUMENTS

| | | | |
|---|---|---|---|
| 2,301,954 A | 5/1941 | Knox | |
| 2,738,236 A | 3/1956 | Haushalter | |
| 3,377,110 A * | 4/1968 | Boggs | 305/42 |
| 3,948,574 A * | 4/1976 | Baylor | 305/103 |
| 4,112,574 A * | 9/1978 | Deli | 29/527.1 |
| 4,195,887 A * | 4/1980 | Ruddell | 305/42 |
| 4,209,204 A | 6/1980 | Wagner et al. | |
| 4,246,689 A * | 1/1981 | Deli | 29/436 |
| 4,351,573 A | 9/1982 | Bedis et al. | |
| 4,435,097 A * | 3/1984 | Peterson | 384/221 |
| 4,543,010 A * | 9/1985 | Moore | 403/225 |
| 4,840,438 A | 6/1989 | Cory | |
| 4,892,365 A | 1/1990 | Szakacs | |
| 5,749,634 A | 5/1998 | Wiesner et al. | |
| 6,042,271 A * | 3/2000 | Harris et al. | 384/299 |
| 6,382,742 B1 * | 5/2002 | Hasselbusch et al. | 305/102 |
| 7,597,410 B2 | 10/2009 | Mulligan et al. | |
| 7,657,990 B2 | 2/2010 | Wodrich et al. | |
| 2012/0019055 A1 * | 1/2012 | Giusti | 305/106 |

* cited by examiner

*Primary Examiner* — Kip T Kotter
(74) *Attorney, Agent, or Firm* — Quarles & Brady LLP

(57) ABSTRACT

A track chain assembly for a crawler type work vehicle includes a plurality of links pivotally connected together at respective link joints. Each link joint includes a bushing, a pin, and at least one elastomeric bearing. Each elastomeric bearing includes an inside diameter (ID) engaging the pin and an outside diameter (OD) engaging a link and/or bushing. Each elastomeric bearing includes a plurality of alternating metal layers and elastomer layers.

18 Claims, 4 Drawing Sheets

TRACK CHAIN JOINT FOR A CRAWLER TYPE WORK VEHICLE

FIELD OF THE INVENTION

The present invention relates to the undercarriage of a crawler type work vehicle, and, more particularly, to track chain joints used with track chains on such undercarriages.

BACKGROUND OF THE INVENTION

Work vehicles, such as construction, forestry, agricultural or mining work vehicles, typically are propelled across the ground using wheels or endless tracks. Track type work vehicles may include a heavy elastomeric endless track or a steel endless track. An example of an agricultural work vehicle including an elastomeric endless track is the 9030T series tractor which is manufactured and sold by the assignee of the present invention. Examples of construction work vehicles including a steel endless track are the 1050J crawler dozer and 755D crawler loader, each of which are manufactured and sold by the assignee of the present invention.

A crawler type vehicle with a steel endless track as described above typically includes an undercarriage with a track chain which is carried by a plurality of sprockets and rollers. The track chain in turn includes a number of interconnected links, with each link carrying a corresponding shoe that extends crossways to the travel direction of the crawler type vehicle. The links are typically interconnected using a pivoting bushing and pin arrangement at each link joint. Such a link joint may be sealed and lubricated or greased to extend the wear life and prevent foreign matter such as dirt from entering the link joint area.

Link joints which are sealed and lubricated or greased do much to increase the operating life of the track chain. However, it is still possible for the seals to fail at the axial end of the bushing; thus allowing the lubricant to leak out or dirt to enter into the link joint area. When this happens, the operating life of the track chain is shortened considerably.

What is needed in the art is a track chain for a crawler type work vehicle which does not require a sealed or lubricated operating environment, but still has good wear and operating life characteristics.

SUMMARY

The present invention provides a track chain assembly for a crawler vehicle, including an elastomeric bearing in the link joint area which seals at least part of the link joint area and eliminates the need for a lubricant in the link joint area, while still allowing sufficient pivoting motion of the links relative to each other in the link joint area.

The invention in one form is directed to a track chain assembly for a crawler type work vehicle, including a plurality of links pivotally connected together at respective link joints. Each link joint includes a bushing, a pin, and at least one elastomeric bearing. Each elastomeric bearing includes an inside diameter (ID) engaging the pin and an outside diameter (OD) engaging a link and/or bushing. Each elastomeric bearing includes a plurality of alternating metal layers and elastomer layers.

The invention in another form is directed to a crawler type work vehicle, including a chassis and an undercarriage carried by the chassis. The undercarriage includes a track chain having a plurality of links pivotally connected together at respective link joints. Each link joint includes a bushing, a pin, and at least one elastomeric bearing. Each elastomeric bearing includes an ID engaging the pin and an OD engaging a link and/or bushing. Each elastomeric bearing includes a plurality of alternating metal layers and elastomer layers.

The invention in yet another form is directed to a track chain link replacement kit for a crawler type work vehicle. The kit includes a pair of links, a pin and at least one elastomeric bearing. Each link includes opposite ends with a hole formed in each respective end. Each elastomeric bearing includes an ID sized for engaging the pin and an OD sized for engaging a corresponding hole. Each elastomeric bearing includes a plurality of alternating metal layers and elastomer layers. The track chain link replacement kit may also optionally include a bushing having an ID sized for receiving the pin therein.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
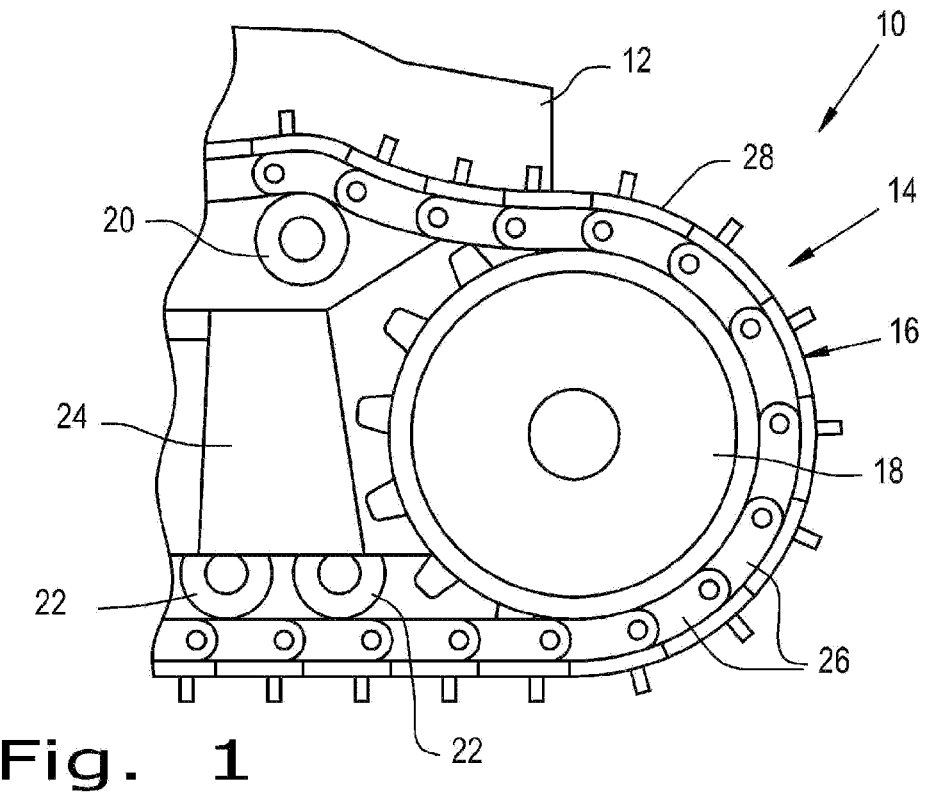
FIG. 1 is a side view of a portion of a crawler type work vehicle including an embodiment of a track chain assembly of the present invention.

Referring now to the drawings, and more particularly to FIG. 1, there is shown a portion of a crawler type work vehicle 10. In the illustrated embodiment, crawler type work vehicle 10 is in the form of a crawler dozer 10, including a vehicle chassis 12 carrying an undercarriage 14. However, other types of work vehicles may also include steel endless tracks, such as loaders, excavators, etc., and any such work vehicle including a steel endless track for propulsion is herein considered to be a crawler type work vehicle.

Undercarriage 14 generally includes an endless track chain assembly 16 which is carried by a plurality of rollers and sprockets, such as rear drive roller/sprocket 18, idler roller 20 and plurality of track rollers 22 carried by track frame 24. Undercarriage 14 may include other rollers and sprockets, not shown, such as a front idler roller, etc.

Figure 2:
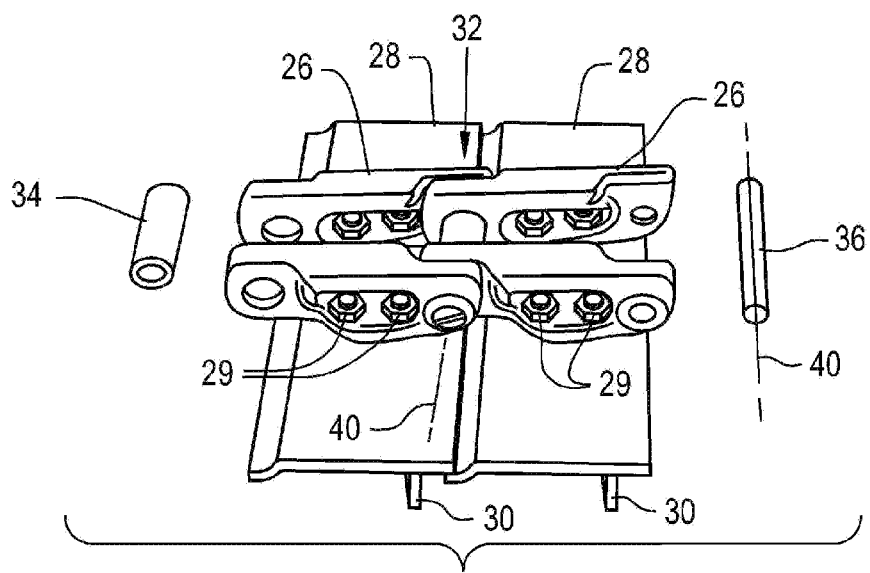
FIG. 2 is a perspective view of part of the track chain assembly shown in FIG. 1.

FIG. 2 is a perspective view illustrating track chain assembly 16 in greater detail. Track chain assembly 16 generally includes a plurality of links 26, each of which is coupled with and carries a corresponding shoe 28, such as by using bolts 29. Each shoe 28 may have a corresponding shape, depending on the particular application of crawler type work vehicle 10.

For example, each shoe 28 may include a cleat or grouser 30 with a desired shape to provide additional traction with the soil.

The plurality of links 26 are pivotally interconnected together at respective link joints 32. Each link joint 32 includes a bushing 34, a pin 36 and at least one elastomeric bearing 38 (which is not shown in FIG. 2, but is shown in the perspective sectional view of FIG. 3). Pin 36 has an axis of rotation 40 defining a longitudinal direction of each link joint 32, and defines the axis of rotation about which the respective links 26 at each link joint 32 pivot relative to each other during operation. Each link joint 32 includes two pairs of links 26 at opposite ends of a respective pin 36, with an inner link 26A and an outer link 26B, relative to the longitudinal direction of a corresponding pin 36. Bushing 34 defines the spacing between the two pairs of links 26A, 26B at opposite ends of pin 36.

Figure 3:
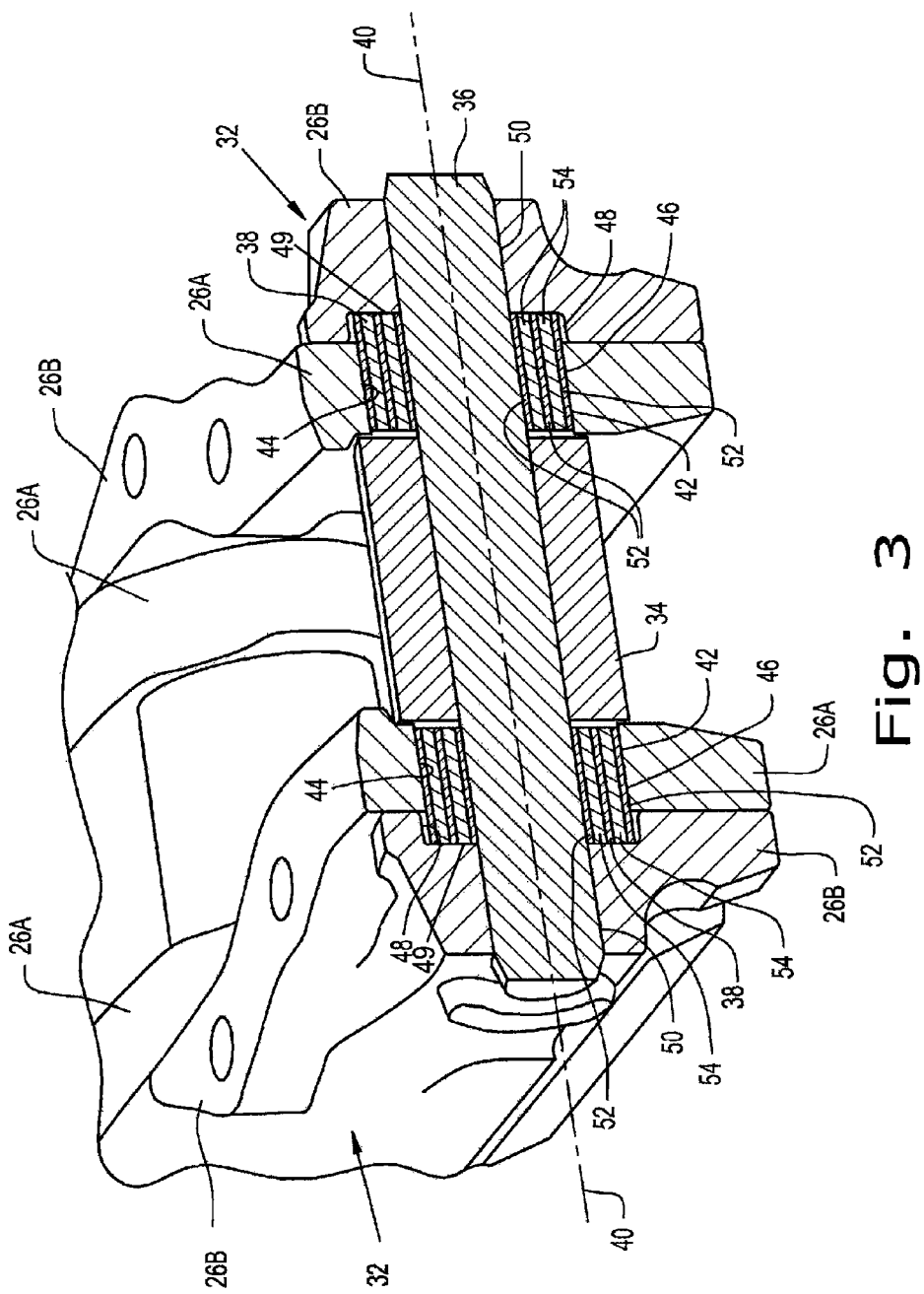
FIG. 3 is a perspective, sectional view of a link joint shown in FIG. 2.

Elastomeric bearing 38 includes an OD 42 which engages an ID 44 of at least one link 26 and/or bushing 34. In the specific embodiment shown in FIG. 3, elastomeric bearing 38 has an OD 42 which engages an ID 44 formed in inner link 26A. More specifically, each inner link 26A includes a hole 46 which is sized and configured to receive the OD 44 of a corresponding elastomeric bearing 38 therein. Hole 46 extends entirely through inner link 26A. Moreover, each outer link 26B includes a hole 48 which is formed as a blind hole extending partially therethrough to an end surface 49, which, as shown in FIG. 3, may be next to the outer side of each elastomeric bearing 38. The OD 42 of elastomeric bearing 38 is press fit into hole 46 but has a radial clearance relative to the ID of hole 48, thus allowing each inner link 26A to pivot relative to an adjacent outer link 26B. Each outer link 26B also includes a hole 50 which is smaller in diameter than hole 48. Each longitudinal end of pin 36 is press fit into the ID of elastomeric bearing 38 and hole 50. As shown in FIG. 3, for example, pin 36 may be fixedly engaged within the ID of elastomeric bearing 38 along substantially the entire axial distance of each hole 46 and 48.

Each elastomeric bearing 38 includes a plurality of alternating metal layers 52 and elastomer layers 54. In the specific embodiment shown in FIG. 3, elastomeric bearing 38 includes three annular steel layers 52 which alternate with two annular elastomer layers 54. The inner most steel layer 52 lies against pin 36, while the outermost steel layer 52 lies against the ID 44 of hole 46A formed in each inner link 26A.

Figure 4:
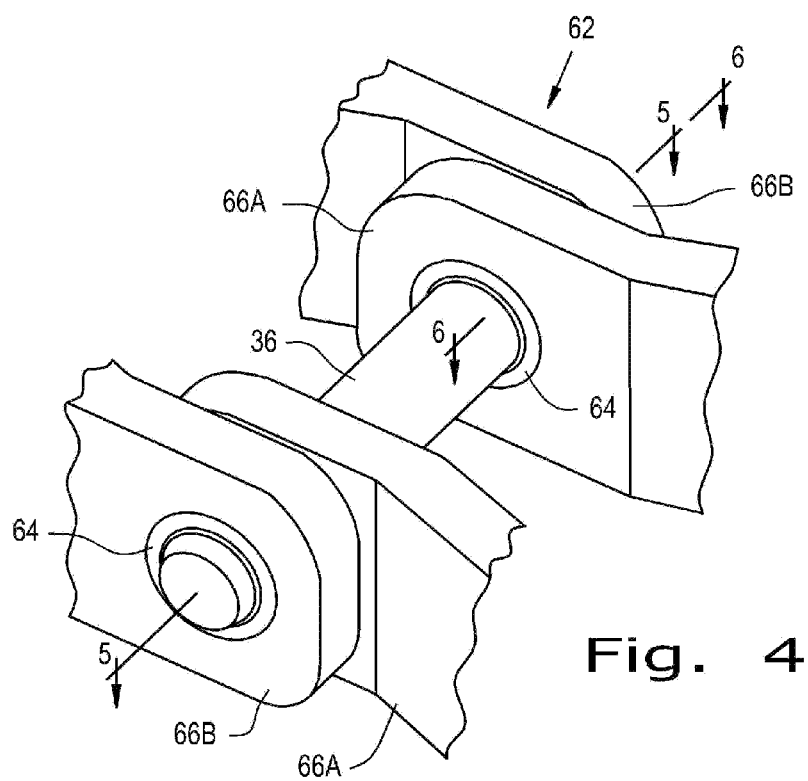
FIG. 4 is a perspective view of a portion of a link joint in another embodiment of a track chain assembly of the present invention.
Figure 5:
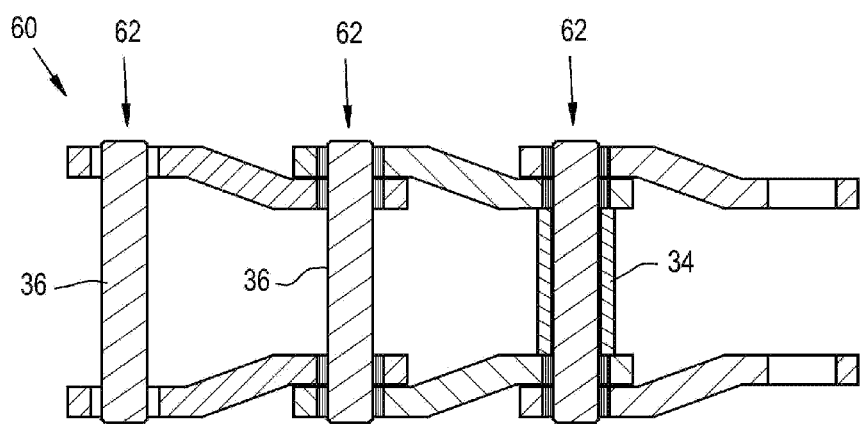
FIG. 5 is a sectional view taken along line 5-5 in FIG. 4.
Figure 6:
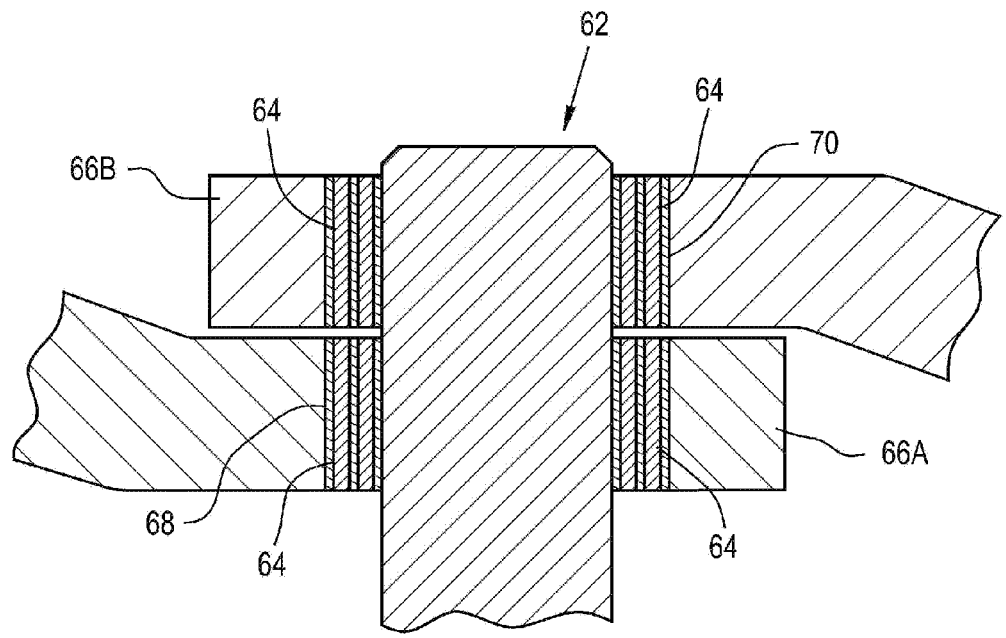
FIG. 6 is a sectional view taken along line 6-6 in FIG. 4.

Referring now to FIGS. 4-6, there is shown another embodiment of a track chain assembly 60 of the present invention which may be used on a crawler type work vehicle. In this embodiment, each link joint 62 includes four elastomeric bearings 64. Each link joint 62 includes a pin 36 and a bushing 34, only one of which is shown in the right-most link joint 62 of FIG. 5 for purposes of simplicity. As before, bushing 34 maintains the proper longitudinal spacing between the adjacent inner links 66A. However, unlike the embodiment of link joint 32 shown in FIG. 3, each link joint 62 shown in FIGS. 4-6 includes four elastomeric bearings 64. To that end, each inner link 66A and each outer link 66B has a respective hole 68 and 70 formed therein. Each elastomeric bearing 64 has an OD which is press fit into a corresponding hole 68 or 70, and an ID providing an interference fit with pin 36. Configured in this matter, it will be appreciated that inner links 66A can pivot relative to outer links 66B at each link joint 62.

Figure 7:
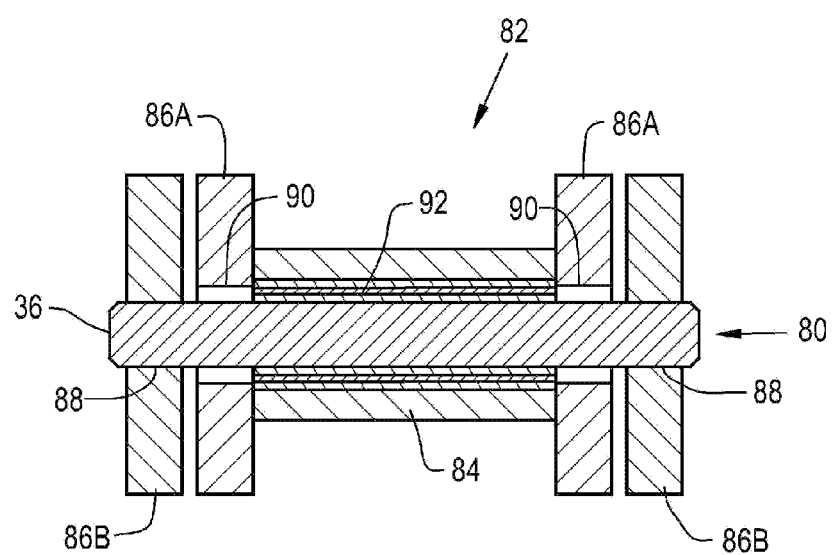
FIG. 7 is a sectional view through a link joint in yet another embodiment of a track chain assembly of the present invention.

Referring now to FIG. 7, there is shown a sectional view through a link joint 80 of another embodiment of a track chain assembly 82 of the present invention. In this embodiment, bushing 84 is affixed at its longitudinal opposite ends with each inner link 86A. Pin 36 is press fit into a corresponding hole 88 formed in each outer link 86B. On the other hand, a slight radial clearance exists between the OD of pin 36 and the ID of hole 90 formed in each inner link 86A.

Elastomeric bearing 92 extends between and interconnects bushing 84 with pin 36. Elastomeric bearing 92 forms a sealed environment between bushing 84 and pin 36, thus preventing any foreign matter from entering into this area. Elastomeric bearing 92 includes a radially outer elastomer layer defining an OD which engages an ID of bushing 84. Similarly, elastomeric bearing 92 includes a radially inner elastomer layer defining an ID which engages the OD of pin 36. Each of the radially inner elastomer layer and the radially outer elastomer layer are bonded with bushing 84 and pin 36, respectively, such as by partially melting the respective elastomer layers.

From the foregoing description, it will be appreciated that a track chain replacement kit may be provided which includes a pair of links, a pin and at least one elastomeric bearing. For example, referring to FIGS. 2 and 3, a single pair of offset links 26 defines the inner links 26A and outer links 26B at the adjacent link joints 32. A track chain replacement kit may include a single pin for use at one end of the offset links 26, or may include two pins. The track chain replacement kit may also include bushing 34 and a pair of elastomeric bearings 38. Such a track chain replacement kit could be used to replace a faulty pair of links in a track chain on a crawler type work vehicle 10. Similar track chain replacement kits could be provided to replace faulty links on the embodiments of the track chains shown in FIGS. 4-6 and 7.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A track chain assembly for a crawler type work vehicle, comprising:
a plurality of links pivotally connected together at respective link joints, each said link joint connecting a first link and a second link, each link joint including a bushing, a pin, and at least one elastomeric bearing, said pin engaging said second link, each said elastomeric bearing including an inside diameter (ID) engaging said pin and an outside diameter (OD) engaging said first link and radially spaced from said second link, each said elastomeric bearing including a plurality of alternating metal annular layers and elastomer annular layers, each said link joint including said first and said second links at opposite ends of a respective said pin, one of said first and second links is an inner link and the other link is an outer link relative to a longitudinal direction of a corresponding said pin, each said first link and each said second link including a hole which is sized and configured to receive a corresponding said elastomeric bearing therein, each said elastomeric bearing spanning and interconnecting between an adjacent said first link and said second link.

2. The track chain assembly of claim 1, wherein each said elastomeric bearing includes a plurality of alternating steel and elastomer annular layers.

3. The track chain assembly of claim 2, wherein each said elastomeric bearing includes two elastomer annular layers.

4. The track chain assembly of claim 3, wherein each said elastomeric bearing includes three steel annular layers.

5. The track chain assembly of claim 1, wherein said outside diameter of each said elastomeric bearing engages an inside diameter of said hole formed in each said first link.

6. The track chain assembly of claim 1, wherein said hole in said second link receiving the corresponding said elastomeric bearing includes a first diameter portion and a second diameter portion in which said second diameter is larger than said first diameter.

7. The track chain assembly of claim 6, wherein said second diameter portion defines a recess open to said first link extending an axial distance and having an end surface extending radially between said first and second diameters, and wherein the corresponding said elastomeric bearing is partially disposed in said recess to be adjacent to said radial surface and partially disposed in said hole in said first link.

8. The track chain assembly of claim 7, wherein said pin is fixedly engaged to said inner diameter of the corresponding said elastomeric bearing along substantially all of said axial distance of said recess.

9. A crawler type work vehicle, comprising:
  a chassis; and
  an undercarriage carried by said chassis, said undercarriage including a track chain having a plurality of links pivotally connected together at respective link joints, each said link join connecting a first link and a second link, each said link joint including a bushing, a pin, and at least one elastomeric bearing, said pin engaging said second link, each said elastomeric bearing including an inside diameter (ID) engaging said pin and an outside diameter (OD) engaging said first link and radially spaced from said second link, each said elastomeric bearing including a plurality of alternating metal annular layers and elastomer annular layers, each said link joint including said first and second links at opposite ends of a respective said pin, one of said first and second links is an inner link and the other link is an outer link relative to a longitudinal direction of a corresponding said pin, each said first link and each said second link including a hole which is sized and configured to receive a corresponding said elastomeric bearing therein, each said elastomeric bearing spanning and interconnecting between an adjacent said link and said link.

10. The crawler type work vehicle of claim 9, wherein each said elastomeric bearing includes a plurality of alternating steel and elastomer annular layers.

11. The crawler type work vehicle of claim 10, wherein each said elastomeric bearing includes two elastomer annular layers.

12. The crawler type work vehicle of claim 11, wherein each said elastomeric bearing includes three steel annular layers.

13. The crawler type work vehicle of claim 9, wherein said outside diameter of each said elastomeric bearing engages an inside diameter of said hole formed in each said first link.

14. The crawler type work vehicle of claim 9, wherein said hole in said second link receiving the corresponding said elastomeric bearing includes a first diameter portion and a second diameter portion in which said second diameter is larger than said first diameter.

15. The crawler type work vehicle of claim 14, wherein said second diameter portion defines a recess opening to said first link extending an axial distance and having an end surface extending radially between said first and second diameters, and wherein the corresponding said elastomeric bearing is partially disposed in said recess to be adjacent to said radial surface and partially disposed in said hole in said first link.

16. The crawler type work vehicle of claim 15, wherein said pin is fixedly engaged to said inner diameter of the corresponding said elastomeric bearing along substantially all of said axial distance of said recess.

17. A track chain assembly for a crawler type work vehicle, comprising a plurality of links pivotally connected together at respective link joints, each said link joint including:
  a pin extending in a longitudinal direction;
  a first link and a second link arranged at inner and outer sides with respect to said longitudinal direction of said pin, said first link defining a first inside diameter, and said second link defining a second inside diameter and a third inside diameter that is different from the first and second inside diameters, said second inside diameter defining a recess extending an axial distance along a portion of said second link toward said first link; and
  at least one elastomeric bearing including a plurality of alternating metal annular layers and elastomer annular layers and being sized and configured to be received in said first inside diameter of said first link and said recess of said second link, each at least one said elastomeric bearing including an inside diameter and an outside diameter;
  wherein said first diameter of said first link fixedly engages said outside diameter of said at least one elastomeric bearing, and wherein said pin fixedly engages said third inside diameter of said second link and said inside diameter of said at least one elastomeric bearing.

18. The track chain assembly of claim 17, wherein said second link defines an end surface extending radially between said second and third diameters, and wherein each said at least one elastomeric bearing is partially disposed in said recess to be adjacent to said end surface and partially disposed in said first link so that said at least one elastomeric bearing spans and interconnects between said first and second links;
  wherein said pin is fixedly engaged to said inner diameter of said at least one elastomeric bearing along substantially all of said axial distance of said recess.

* * * * *